(12) United States Patent
Beenken

(10) Patent No.: US 9,836,690 B2
(45) Date of Patent: Dec. 5, 2017

(54) VEHICLE IDENTIFICATION MEANS

(71) Applicant: Tönnjes ISI Patent Holding GmbH, Delmenhorst (DE)

(72) Inventor: Björn Beenken, Ganderkesee (DE)

(73) Assignee: Tönnjes ISI Patent Holding GmbH, Delmenhorst (DE)

( * ) Notice: Subject to any disclaimer, the term of this patent is extended or adjusted under 35 U.S.C. 154(b) by 0 days.

(21) Appl. No.: 14/414,499

(22) PCT Filed: Jul. 22, 2013

(86) PCT No.: PCT/EP2013/002161
§ 371 (c)(1),
(2) Date: Jan. 13, 2015

(87) PCT Pub. No.: WO2014/012676
PCT Pub. Date: Jan. 23, 2014

(65) Prior Publication Data
US 2015/0170019 A1    Jun. 18, 2015

(30) Foreign Application Priority Data
Jul. 20, 2012   (DE) .......................... 10 2012 106 594

(51) Int. Cl.
*G06K 19/07* (2006.01)
*G06K 19/16* (2006.01)
(Continued)

(52) U.S. Cl.
CPC .............. *G06K 19/16* (2013.01); *B60R 13/10* (2013.01); *G06K 19/0724* (2013.01);
(Continued)

(58) Field of Classification Search
CPC ......... G06K 19/0776; G06K 19/07372; G06K 19/0724; G06K 19/07722; G06K 19/0779;
(Continued)

(56) References Cited

U.S. PATENT DOCUMENTS 6,618,024 B1 * 9/2003 Adair ............... G06K 19/07749
235/451
7,034,688 B2   4/2006 Rietzler
(Continued)

FOREIGN PATENT DOCUMENTS

DE   102009033559 A1   5/2010
EP      1179811 A1     2/2002
(Continued)

OTHER PUBLICATIONS

WIPO, International Search Report (on parent application PCT/EP2013/002161), dated Jan. 21, 2014.
(Continued)

*Primary Examiner* — Claude J Brown
(74) *Attorney, Agent, or Firm* — Laurence P. Colton; Smith Tempel Blaha LLC

(57) ABSTRACT

A vehicle identification means (10) that has an at least partially electrically conductive film (12) and a hologram (36) and/or a reflective film. In addition, at least one data carrier (26), which can be read out in a contactless manner, having an antenna is provided. The hologram (36) is implemented as an antenna for the data carrier (26). A separate antenna is therefore no longer necessary. In addition, multiple antennas can be provided in parallel.

35 Claims, 4 Drawing Sheets

(51) Int. Cl.
*B60R 13/10* (2006.01)
*H01Q 1/12* (2006.01)
*G06K 19/077* (2006.01)
*H01Q 1/22* (2006.01)
*H01Q 1/32* (2006.01)
*H01Q 1/38* (2006.01)

(52) U.S. Cl.
CPC ... *G06K 19/0776* (2013.01); *G06K 19/07773* (2013.01); *G06K 19/07783* (2013.01); *G06K 19/07798* (2013.01); *H01Q 1/1271* (2013.01); *H01Q 1/2225* (2013.01); *H01Q 1/3283* (2013.01); *H01Q 1/38* (2013.01)

(58) Field of Classification Search
CPC ....... G06K 19/07794; G06K 19/07798; G06K 19/16; G06K 19/07773; G06K 19/07783; B60R 13/10; H01Q 1/2225; H01Q 1/3283; H01Q 1/1271
USPC ........................................................ 235/488
See application file for complete search history.

(56) References Cited

U.S. PATENT DOCUMENTS

| | | | | |
|---|---|---|---|---|
| 2002/0135481 | A1* | 9/2002 | Conwell | G06K 19/073 340/572.1 |
| 2002/0160786 | A1* | 10/2002 | Rietzler | C23F 1/02 455/455 |
| 2005/0046573 | A1* | 3/2005 | Velasco | G06K 19/07 340/572.8 |
| 2006/0066441 | A1* | 3/2006 | Knadle, Jr. | G06K 7/0008 340/10.1 |
| 2007/0164868 | A1* | 7/2007 | Deavours | G06K 19/07749 340/572.7 |
| 2008/0020165 | A1* | 1/2008 | Drori | G09F 3/0292 428/40.1 |
| 2008/0157928 | A1 | 7/2008 | Butler | |
| 2008/0180328 | A1* | 7/2008 | Yamagajo | G06K 19/07786 343/700 MS |
| 2008/0245791 | A1* | 10/2008 | Atherton | B65D 5/4233 220/200 |
| 2009/0128332 | A1* | 5/2009 | Lu | G06K 19/07749 340/572.1 |
| 2010/0123010 | A1* | 5/2010 | Sakama | G06K 19/07749 235/492 |
| 2011/0090058 | A1* | 4/2011 | Ikemoto | H01Q 5/35 340/10.1 |
| 2011/0258894 | A1 | 10/2011 | Beenken | |
| 2011/0284641 | A1* | 11/2011 | Yang | G06K 19/07786 235/492 |
| 2012/0019363 | A1* | 1/2012 | Fein | G06K 19/072 340/10.1 |
| 2013/0113627 | A1* | 5/2013 | Tiedmann | G08B 13/2431 340/572.1 |
| 2015/0048159 | A1* | 2/2015 | Martinez de Velasco Cortina | G06Q 20/3227 235/379 |

FOREIGN PATENT DOCUMENTS

| | | |
|---|---|---|
| JP | 2002042088 A | 2/2002 |
| JP | 2002366915 A1 | 12/2002 |
| MX | 2011004652 A | 5/2011 |
| WO | 2004015625 A | 2/2004 |
| WO | 2004015625 A1 | 2/2004 |

OTHER PUBLICATIONS

Chile Patent Office, Expert Report on Invention Patent Application (search report on related application).
Mexico Patent Office, Office Action on related application, dated Sep. 6, 2016.
New Zealand Intellectual Property Office, First ExaminatioN Report (Nov. 2, 2016).
Mexico Patent Office, Office Action on related application MX/E/2016/069727, dated Oct. 28, 2016.
Australian Government IP Australia, Patent Examination Report No. 1 (in a related application), dated Sep. 14, 2016.

* cited by examiner

US 9,836,690 B2

VEHICLE IDENTIFICATION MEANS

STATEMENT OF RELATED APPLICATIONS

This application is the US National Phase of International Application No. PCT/EP2013/002161 having an international filing date of 22 Jul. 2013, which claims the benefit of and priority on German Patent Application No. 102012106594.2 having a filing date of 20 Jul. 2012.

BACKGROUND OF THE INVENTION

Technical Field

The invention relates to a vehicle identification means, preferably a vehicle identification, having an at least partially electrically conductive film which is at least partially implemented as a hologram, a data carrier which can be read out in a contactless manner, in particular a radio chip, and an antenna for the data carrier, a vehicle identification means, preferably a vehicle identification, having an at least partially electrically conductive film which is at least partially implemented as a hologram and/or as a reflective film, a data carrier which can be read out in a contactless manner, in particular a radio chip, and an antenna for the data carrier, or a vehicle identification means having an at least partially electrically conductive film, at least one data carrier which can be read out in a contactless manner, in particular a radio chip, wherein the data carrier can be read out in multiple frequency ranges independently of one another and wherein the film is at least partially implemented as an antenna for the at least one data carrier, respectively.

Prior Art

The vehicle identification means described here are used for identifying vehicles by means of a unique identification in particular. This identification preferably contains a combination of letters and/or numbers or also other data to be uniquely assigned. For the unique assignment to a vehicle, the vehicle identification means is fastened, for example, to a so-called license plate on the front and/or rear to the vehicle body or the bumper of a vehicle. Alternatively or additionally, for example, the vehicle identification means can also be attached or glued onto a (window) pane, such as a windshield in particular. It can accordingly be used as a so-called auxiliary identification or "third identification".

The above-described vehicle identification means are frequently forged or used without authorization for other vehicles, to which they are not assigned. This may be prevented or at least proven, for example, by using vehicle identification means, if the latter has a data carrier which can be read out in a contactless manner. For this purpose, data of the vehicle with which the identification means are associated are stored on the data carrier. In addition, the combination of letters and numbers of the actual identification or at least another unique identification code is frequently also stored in the data carrier.

The readout of the data carrier is typically performed by means of an external read device. By way of a comparison of the read out data to that of the vehicle on which the data carrier is fastened, conclusions can be drawn about possible manipulations. In particular, it may thus be established whether the identification means is assigned to the correct vehicle or a foreign vehicle.

Previously known vehicle identification means have typically been based on a film, which is particularly at least partially electrically conductive. For protection from manipulations, these means can be equipped with a hologram, which is destroyed, in particular when it is detached. Alternatively or additionally, the film can be implemented as a reflective film. Such a light-reflecting (reflective) film is used to make an identification inscription, which is typically applied in non-reflective form, better visible, in particular in the case of artificial illumination in darkness. In addition, a data carrier can be provided, which requires a separate antenna for the readout. Such vehicle identification means are accordingly complex to produce and susceptible to malfunction in the handling in particular because of the variety of different components.

BRIEF SUMMARY OF THE INVENTION

The invention is based on the object of providing an improved vehicle identification means, which has the simplest possible structure and is preferably less susceptible to malfunction.

A vehicle identification means to achieve this object is a vehicle identification means, preferably a vehicle identification, having an at least partially electrically conductive film which is at least partially implemented as a hologram, a data carrier which can be read out in a contactless manner, in particular a radio chip, and an antenna for the data carrier, characterized in that the hologram is implemented as an antenna for the data carrier. In this identification means, the hologram is implemented as an antenna for the data carrier. Accordingly, it is not necessary to provide an antenna as a separate component. The structure of the vehicle identification means is therefore simpler as a whole and also less susceptible to malfunction. The film of the vehicle identification means is at least partially electrically conductive. The hologram is preferably at least partially implemented in the conductive regions of the film. It preferably covers at least nearly the entire film surface, in particular except for the possible openings described hereafter. It is a reflective hologram in particular. Therefore, malfunction-free operation of the vehicle identification means can be ensured. In particular, a readout is possible by means of the hologram as an antenna.

A vehicle identification means for achieving this object is a vehicle identification means, preferably a vehicle identification, having an at least partially electrically conductive film which is at least partially implemented as a hologram and/or as a reflective film, a data carrier which can be read out in a contactless manner, in particular a radio chip, and an antenna for the data carrier, characterized in that the hologram and/or the reflective film is implemented as an antenna for the data carrier. In this identification means, the hologram is implemented as an antenna for the data carrier. Alternatively or additionally, the reflective film can be implemented as an antenna. Accordingly, it is not necessary to provide an antenna as a separate component. The structure of the vehicle identification means is therefore simpler as a whole and also less susceptible to malfunction. The film of the vehicle identification means is at least partially electrically conductive. The hologram is preferably implemented at least partially in the conductive regions of the film. It preferably covers at least nearly the entire film surface, in particular except for the possible openings described hereafter. It is a reflective hologram in particular. Therefore, malfunction-free operation of the vehicle identification means can be ensured. In particular, a readout is possible by means of the hologram as an antenna.

The data carrier can preferably be read out in multiple frequency ranges independently of one another. One data carrier or multiple data carriers can be provided. The data carriers can preferably be read out in the same and/or different frequency ranges, in particular independently of one another. This means that during a readout in one frequency range, a readout does not take place in another frequency range or only takes place with reduced power.

A vehicle identification means for achieving the object mentioned at the outset is a vehicle identification means having an at least partially electrically conductive film, at least one data carrier which can be read out in a contactless manner, in particular a radio chip, wherein the data carrier can be read out in multiple frequency ranges independently of one another and wherein the film is at least partially implemented as an antenna for the at least one data carrier, characterized in that an antenna for the separate readout of the at least one data carrier is provided for each of the frequency ranges. Such an identification means has an antenna for separate readout of the at least one data carrier for each frequency range. The vehicle identification means comprises in particular an at least partially electrically conductive film and at least one data carrier which can be read out in a contactless manner, and which can be read out in multiple frequency ranges independently of one another. The film is at least partially used as an antenna for the at least one data carrier. If a separate antenna is provided for each of the frequency ranges, a separate optimization of each individual antenna can be performed for the respective frequency range or intended purpose, respectively. Thus, a separate or independent readout can be performed in different frequency ranges. In particular, mutual interference is thus significantly reduced or even completely avoided. A readout in separate frequency ranges can relate to a single data carrier which can be read out simultaneously in multiple frequency ranges. Multiple independent antennas can preferably be provided for this purpose. Alternatively, separate data carriers can also be provided which are then preferably each assigned at least one separate antenna. The antennas are preferably each implemented as optimized to the associated frequency range. An optimum range and lack of susceptibility to malfunction can therefore be achieved.

Furthermore, the film is preferably at least partially implemented as a reflective hologram in particular. With the aid of such a hologram, the forgery protection is improved with regard to a visual check of the authenticity of the vehicle identification. The hologram is preferably implemented in this case as an antenna for the data carrier. Due to the use of the hologram as an antenna, it is not necessary to provide a separate antenna. The susceptibility to malfunction is thus reduced and the production of the vehicle identification is simplified. Furthermore, the film is preferably implemented as a self-adhesive film. The film is preferably a reflective film, i.e., a light-reflecting film. The reflective film can also be implemented as an antenna. In particular, the film or the hologram is implemented as a so-called embossed hologram. This means that depressions are embossed into the film or the hologram. These depressions or hologram symbols ensure a holographic, three-dimensional effect. Accordingly, corresponding colored shimmering elements are visible, which change at least in color during the movement of the observer in relation to the hologram. Alternatives are rainbow holograms and/or other thin-film holograms.

The features of the above-described subjects of the invention can optionally also be combined with one another. The following statements additionally relate explicitly to all vehicle identification means according to the invention, however:

A frequently used frequency range is, for example, the high-frequency range (HF) or shortwave range from approximately 3 MHz to 30 MHz. A readout takes place in the near field range here, i.e., at a distance from several centimeters up to several tens of centimeters. A further widespread frequency range is that of ultrahigh frequency (UHF), also called decimeter waves or microwaves, typically at 0.3 GHz to 3 GHz. A readout is typically performed here at a distance of multiple meters up to several tens of meters, but can also be performed at a shorter distance. A readout of one frequency range particularly preferably does not interfere with a readout of another frequency range. Therefore, various data of one or different data carriers can be read out in multiple frequency ranges independently of one another. This is true in particular if multiple separate data carriers are provided, which preferably operate in different frequency ranges. A separate antenna or antenna structure is particularly preferably implemented and/or optimized for the separate readout for each of the frequency ranges. By providing a separate antenna, a separation of the frequency ranges and in particular a separate readout is enabled or at least improved.

The film is particularly preferably equipped with a coating, in particular vapor deposition. The coating is in particular electrically conductive, preferably metallic. This is preferably performed to create the conductivity. The provision of a reflective, in particular metallic coating can possibly also be necessary to create a hologram, however, if it is a correspondingly reflective or reflecting hologram. The metallic layer is then used simultaneously as an electrical conductor and as a reflector surface for light.

The film particularly preferably has the regions in which the electrical conductivity is reduced and/or interrupted. At least one antenna structure for the antenna can thus be implemented in particular. It is preferably a flat and flexible antenna form in the form of a film in this case. The antenna structure is particularly preferably implemented in the form of a slot antenna. Such a slot antenna operates similarly, but practically inversely to a classic dipole antenna. The electrical and magnetic field components are exchanged. In the present case, a slot antenna can be provided by leaving out a small region in the film, preferably in the form of a slot. The essential visual effect of the planar hologram therefore remains in existence. Only a comparatively small slot in the hologram must be provided. At least nearly the entire area of the hologram may preferably be used simultaneously as an antenna here. In a typical dipole antenna, only a small area would be able to be coated or would be electrically conductive and therefore would also be usable as a hologram. Alternatively or additionally, at least one conductor loop, winding, and/or coil (loop), or at least one strip, plate, and/or lug or metal wing (strap) can be provided. These can be used to contact the antenna and/or for coupling into the antenna or in particular as the antenna.

One antenna is furthermore preferably implemented in an opening of another antenna. This is implemented, for example, in that a large area of the hologram as the first antenna is implemented as a surrounding antenna, preferably for UHF. An opening can then be provided, in which a comparatively smaller antenna with respect to area is implemented, in particular made of the same material as the surrounding antenna. This inserted antenna is typically provided for a different frequency range than the surrounding antenna, in particular for HF. Such an inserted antenna preferably has the shape of at least one spiral, coil, conductor loop (loop), strip, plate, lug, metal wing (strap), and/or the like. To have an optimum transmitting and receiving power, the antennas are optimized for the respective frequency range. An antenna which is smaller with respect to area is typically provided in this case for higher frequencies. Therefore, the hologram can also be used as an antenna for the data carrier. An antenna structure is preferably formed in the hologram.

The data carrier is particularly preferably electrically connected to the antenna or the electrically conductive layer, in particular the hologram and/or the reflective film. The electrical connection preferably takes place in a galvanic and/or capacitive and/or inductive manner. A direct electrical connection and/or a capacitive coupling and/or an inductive coupling, in particular by means of a coil, is accordingly provided. An electrically conductive contact can be produced, for example, with the aid of a solder or tin solder or another permanent and conductive type of connection. In particular, an adhesive can also be provided, which is used for fixing the data carrier. The adhesive can additionally implement a conductivity, for example, in the event of pressure application or after heating. For this purpose, conductive particles can be embedded in the adhesive, which are pressed together when pressure is applied and therefore implement a conductive connection. Alternatively, particles can be fused together or agglomerated by heating, so that a conductive connection is also produced. A capacitive or inductive coupling is typically performed with the aid of a coil, other suitable conductor webs, or a corresponding antenna structure, respectively.

At least one of the antennas is preferably implemented as a near-field antenna. The frequency range of the near field is in particular in HF. At least one of the antennas is preferably implemented as a far-field antenna. Its frequency range is preferably in UHF. In particular, separate structures are provided for each antenna. Depending on the frequency range, different fields of use of the individual antennas or antenna structures result. A near-field antenna can, for example, first be read out by bringing an external read device up close, up to from a few centimeters to decimeters. The corresponding frequency range is typically in the HF (high-frequency) range. This can be performed with the aid of a correspondingly prepared mobile telephone, for example, which has a communication unit for the near field (near-field communications, NFC). A readout in the far field is typically performed using corresponding stationary transmitters. Therefore, a readout can be performed over a distance from several meters up to several tens of meters, also during a relative movement of the vehicle identification means and read device. This is the case, for example, with traveling vehicles, which are read out using stationary read-out devices.

The film of the vehicle identification preferably has an adhesive layer on at least one side. With the aid of this adhesive layer, the vehicle identification can preferably be permanently fastened on a vehicle, in particular on a windowpane, preferably a windshield. The adhesive layer is preferably applied on the side of the reflective coating or the electrically conductive coating. The reflective layer or the conductive coating is therefore glued on facing toward the vehicle part. A mechanical protection of the coating is therefore ensured simultaneously. The adhesive layer can be cured after the application by a separate curing process, in particular by means of artificial ultraviolet (UV) light, or, for example, also by irradiation of sunlight, in particular as natural UV light. The adhesive can cure in various ways. This can take place, for example, by way of temperature, radiation action, or the like. In particular, curing can take place due to UV light, for example, by way of a UV lamp or also sunlight.

Furthermore, the film preferably has at least one adhesive layer for the preferably permanent gluing of at least two layers of the film to one another. The film can be folded together in particular at a predetermined bending point for this purpose. The folded together layers of the film are in particular at least essentially congruent to one another. Alternatively, one of the at least two film layers, which can be folded together, can protrude beyond the other with respect to area. The smaller film layer is preferably arranged below the one which is larger with respect to area and is preferably arranged facing toward the vehicle part, so that it is better protected.

Furthermore, the film can preferably be inscribed on at least one side. The inscription can preferably be arranged between two layers of the film which can be fastened on one another. In particular, the inscription can be performed directly on the film. Alternatively, it can be applied and/or introduced on or into a coating or by means of an additional film or another material. In that the inscription is preferably performed between the layers of the film, manipulation of the inscription is made substantially more difficult or even prevented after the gluing together. The inscription can also be arranged on a bottom side of the film facing toward the vehicle or in the region of the adhesive layer for protection from manipulation, however.

Furthermore, the data carrier or the radio chip is preferably placed on the film. An opening can particularly preferably be provided in the film, into which the data carrier is insertable. The radio chip is preferably arranged on the side of the film having the adhesive layer, in particular embedded therein, to improve the protection. This is typically the side facing toward the vehicle part. A direct contact between antenna and radio chip is particularly preferably provided. Alternatively or additionally, a coupling can be implemented between antenna and radio chip in an inductive and/or capacitive manner. In particular, a contact can be produced by means of conductor loops (loops) and/or metal lugs or metal wings (straps) and/or the like.

In particular, the film and/or the coating of the film and/or the hologram is provided with recognizable features of destruction in the event of detachment or manipulation. This is performed, for example, in that the adhesive layer detaches parts of the hologram or the film or its coating. This can be achieved in that the adhesive layer adheres more or less strongly to the film or the hologram at individual surface regions. A possible destruction is therefore preferably visually recognizable to an observer without aids. Specifically, this is preferably the case if corresponding partial regions of the hologram are detached. Finally, the transmitting and/or receiving power of the antenna is preferably reduced in the event of a detachment of the adhesive layer and/or a manipulation of the hologram. This is detected by way of a destroyed conductor loop. The manipulation or a detachment of the adhesive layer is preferably detected by the data carrier. For this purpose, in particular a security device can be provided, which is destroyed in the event of detachment or manipulation of the hologram. In particular an elongated conductor loop is suitable for this purpose, for example, which may be completely detached without destruction only with extreme difficulty. Such a security device is also referred to as a "tamper alarm". A manipulation can therefore also be recognized in a technical manner during the readout without difficulties. The data carrier reduces the transmitting power in this case preferably by at least 30%, preferably 50%, particularly preferably at least 70% in relation to the power without manipulation. A reduced transmitting and/or receiving power therefore represents an index of a manipulation.

BRIEF DESCRIPTION OF THE DRAWINGS

Preferred exemplary embodiments of the invention will be explained in greater detail hereafter on the basis of the drawing. In the figures.

DETAILED DESCRIPTION OF PREFERRED EMBODIMENTS

A vehicle identification means 10 according to the invention or also a vehicle identification consists of a planar material, for example, a film 12. The present case relates to essentially rectangular exemplary embodiments of the vehicle identification means 10. However, nearly any other arbitrary (external) geometric shapes of the film or a coating or an imprint of the film are also possible. This is dependent in particular on the local, regional, or national conditions, such as corresponding legal or other regulations, which prescribe corresponding vehicle identification means 10 and their design.

Figure 1:
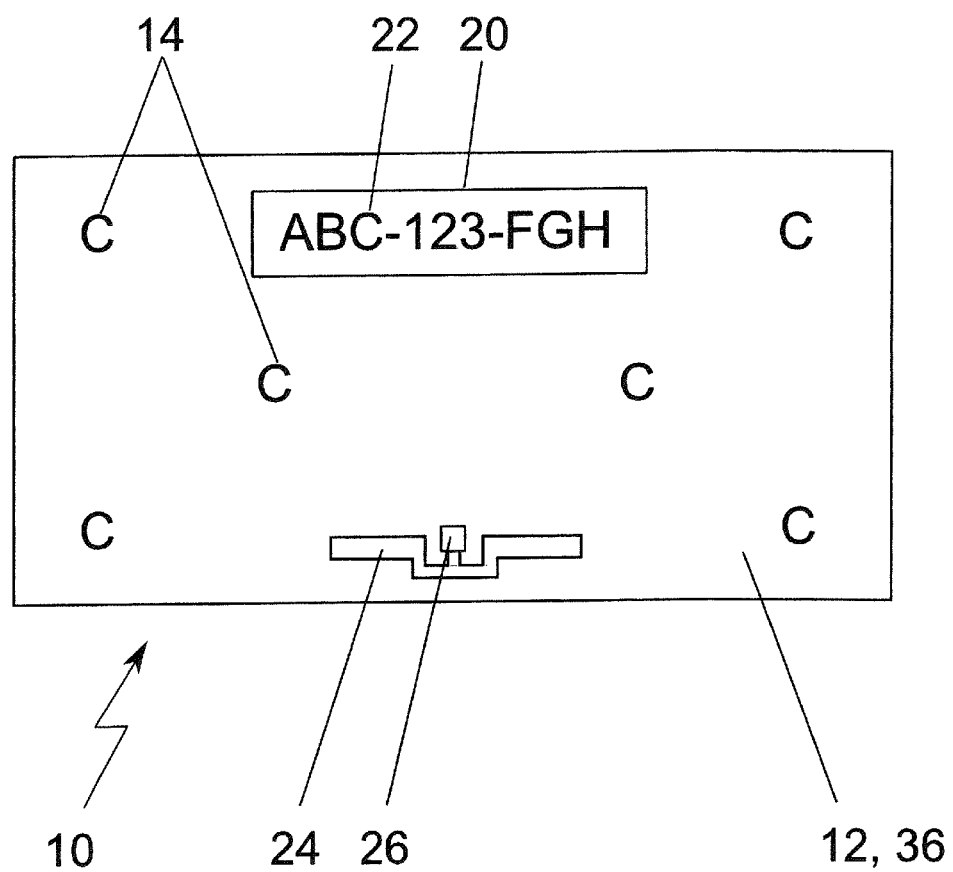
FIG. 1 shows a vehicle identification means according to the invention having a hologram.
Figure 3:
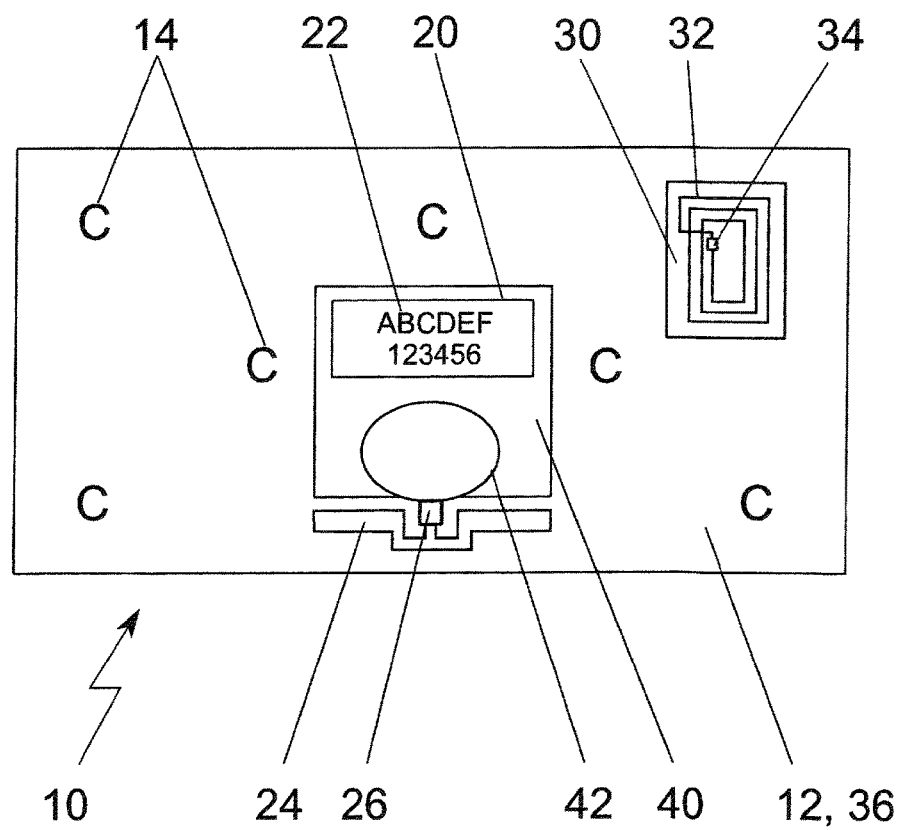
FIG. 3 shows a vehicle identification means according to the invention having two data carriers, two antennas, an additional security device, and a hologram.

The vehicle identification means 10 shown in FIGS. 1 and 3 is equipped in the region of the film 12 with a hologram 36. An array of hologram symbols 14 is shown here as an example, which are only to illustrate the structure or the design of the vehicle identification means 10. The illustrated hologram symbols 14 are in no way fixed in the shape and number shown, but rather can be provided in practically any arbitrary shape and number, in particular also comprehensively. The hologram 36 is a so-called embossed hologram in the present case. This means that depressions are introduced into a coating 16 of the film 12, preferably using a stamping or rolling technology. This coating 16 is implemented, for example, as a metallic layer. The embossed hologram symbols 14 are visible with corresponding colored shimmering and three-dimensional effects in the event of incident light. Alternatively, laser-written holograms may also be provided, for example.

The vehicle identification means 10 has an inscription field 20. An inscription 22 is provided in this inscription field 20, which is used for identification. The inscription 22 of the identification 10 can be applied, for example, by printing, gluing, stamping out, or embossing. The inscription 22 itself is not restricted to the letters and numbers shown here, of course. It can contain any type of inscription and combination of characters or the like, including graphic illustrations. However, in particular at least the official identification or the number on the license plate is frequently provided for identification of the vehicle at this position.

The vehicle identification means 10 additionally has at least one so-called transponder, which is formed from a data carrier 26 and an antenna. In the present case, a so-called slot antenna is used as the antenna. A slot antenna is implemented accordingly as an opening in the form of a slot 24 in an electrically conductive material. The electrically conductive material is represented here by the film 12 having an electrically conductive coating 16. The coating 16 is a metal layer here. A slot antenna functions in a similar manner as a typical dipole antenna because of a corresponding interruption in the electrically conductive material. Only the magnetic and electrical field components are exchanged. The specific implementation of the slot 24 in the present case is a U-shaped curve having lateral arms. The slot shape is used for optimized lock-on of the data carrier 26 which is implemented as a radio chip or RFID chip (radio frequency identification device). Accordingly, the data carrier 26 can be supplied with electrical energy by irradiation of electromagnetic waves via the antenna made of film 12 and slot 24. The data carrier 26 is then capable of in turn emitting the data stored thereon via the slot antenna by radio.

Figure 2:
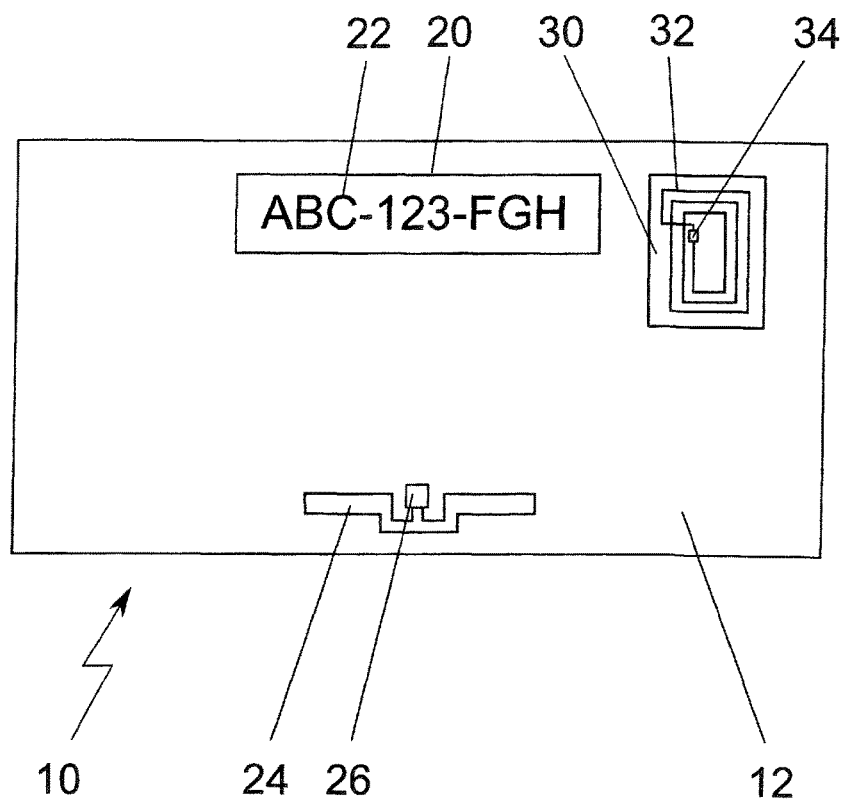
FIG. 2 shows a further vehicle identification means according to the invention having two data carriers and two antennas.

In the further exemplary embodiment shown in FIG. 2, a further opening 30 is provided in the electrically conductive region of the film 12. An antenna coil 32 made of electrically conductive material is provided inside this opening, which is rectangular here. The coil 32 is also formed from the material of the coating 16 in this case. The antenna coil 32 is also coupled to a data carrier 34 as a radio chip.

It is already recognizable on the basis of the dimensions of the two different antennas that the two data carriers 26 and 34 operate in different frequency ranges. The radio chip 34 typically functions in this case in the HF or high-frequency range, while the radio chip 26 operates in the so-called UHF or ultrahigh frequency range. Correspondingly different readout distances are also linked thereto. The HF chip 34 can be read out in the range of several centimeters to decimeters, as a so-called near-field communication (NFC). The UHF radio chip 26, in contrast, can typically also still be read out from a distance of several meters up to a few tens of meters. A readout of the HF chip 34 is typically also performed by a handheld read device, for example, a suitable mobile telephone having integrated NFC read device. A readout of the UHF chip 26, in contrast, can be performed, for example, inter alia, by permanently installed read devices in the region of bridges or in general on roads, in particular also in the case of moving vehicles.

The exemplary embodiment of FIG. 2 in particular does not show a holographic structure in the region of the film 12. The film 12 is implemented as conductive, but does not have to be implemented as a hologram 36. This also fundamentally applies accordingly to the remaining exemplary embodiments.

In a third exemplary embodiment according to FIG. 3, the above-mentioned features are essentially combined with one another. On the one hand, it relates to a holographic material of the film 12, on which hologram symbols 14 are correspondingly shown. In addition, two separate data carriers 26 and 34 having the corresponding slot antenna having the slot 24 or the antenna coil 32, respectively, are provided. Finally, the inscription field 20 with the inscription 22 is arranged in the region of the opening 40 as an example here, instead of on the hologram 36. However, another arrangement is also readily conceivable.

In addition, a further opening 40 is implemented in a central region of the vehicle identification 10. An oval conductor loop 42 is implemented therein, which has an interruption in the lower region in the drawing. It is contacted separately at both ends with the data carrier 26 in the region of this interruption. This is performed such that the data carrier 26 can establish whether the conductor loop 42 produces a closed conductive connection or has an interruption. If the conductor loop 42 has been destroyed, for example, by improper handling, for example, in the scope of a manipulation attempt or an unauthorized detachment of the vehicle identification means 10 from a substrate, this is detected by the data carrier 26. This so-called "tamper alarm" then ensures, for example, that the chip 26 recognizably changes the transmitting power, in particular significantly reduces it or even turns it off entirely. In this manner, it can then be established upon the electronic readout of the data carrier 26 in a simple manner whether a manipulation attempt has taken place.

Figure 4:
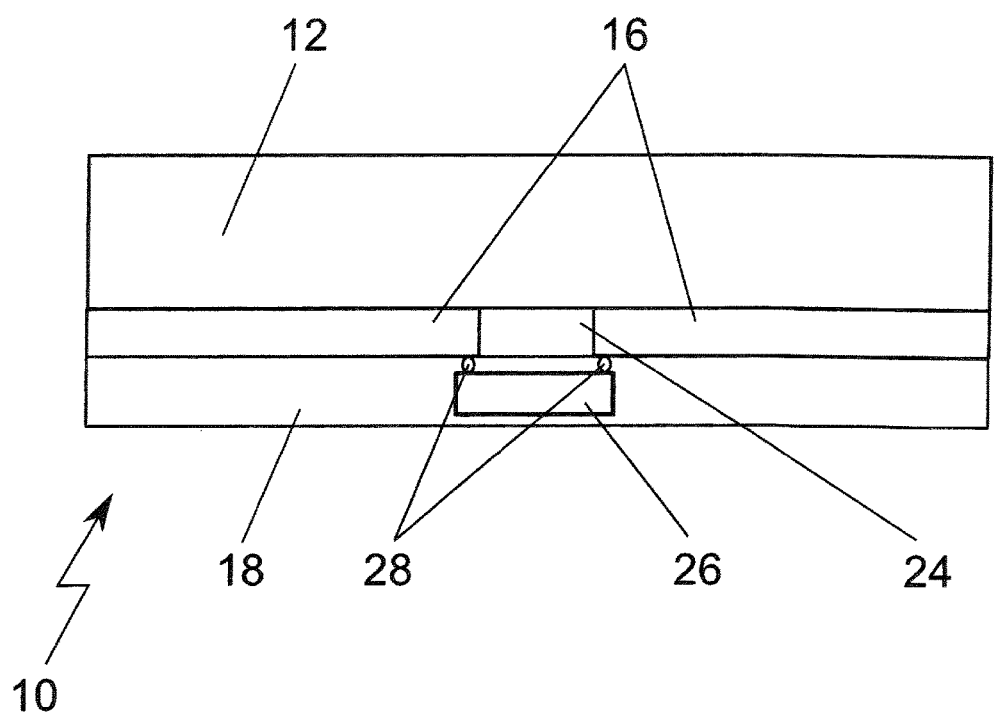
FIG. 4 shows a section through a vehicle identification means according to the invention in the region of a data carrier and slot.

The film 12, as is shown as a sectional image in FIG. 4, forms the carrier material of the vehicle identification means 10. A coating 16 made of a metallic material is applied thereon. This material of the coating 16 is interrupted in particular in the region of the slot 24, so that the conductivity therefore also locally disappears in this region. The data carrier 26 can then be placed as shown on the slot or corresponding contact surfaces of the coating 16. Both sections of the coating located laterally to the slot are each connected to one contact of the data carrier 26 in this case.

Contacts 28 are provided for contacting the data carrier 26 with the coating 16. Solder or tin solder can typically be used for this purpose, for example. However, a more cost-effective and less malfunction-susceptible contacting is provided in the present case. For this purpose, firstly an adhesive is provided for fixedly gluing the data carrier 26 and as a contact material 28. The chip 26 is thus already fixedly connected to the vehicle identification 10. For the electrical contact, for example, pressure can be exerted on the adhesive when it is put on, if the latter contains loosely distributed conductive particles in the interior. While these particles have a sufficient distance from one another in the unloaded state, they are pressed against one another in the event of pressure application and thus result in an electrical contact of the radio chip 26 with the coating 18. The adhesive then fixes the data carrier 26 in this contacted state. Alternatively, a contact can also be produced by an adhesive or a similar material, which induces agglomeration of contained particles by heating, for example. A conductive connection is then established between the contacts of the data carrier 26 and the coating 18 by an accumulation and possible fusing. Heating can be performed by direct heat supply using a soldering tool, for example, or also in another manner, for example, by friction welding or ultrasonic soldering.

Alternatively or additionally, coupling of the transmitting power into the antenna can be performed by means of at least one coil, winding, conductor loop, and/or at least one plate, metal lug, metal wing, or the like. For this purpose, these are conductively connected at least to the radio chip 26. This is used in particular for the inductive or capacitive, alternatively also galvanic coupling into the antenna.

To attach the vehicle identification 10 to a vehicle (not shown), an adhesive layer 18 is provided. This adhesive layer 18 is applied in the present case directly to the coating 16, so that a mechanical protection thereof by the external film 12 is produced simultaneously. The vehicle identification means 10 is then attached using the adhesive layer 18 on the vehicle. As a third vehicle identification 10, it can, for example, be attached on a (window) pane, such as a windshield, in particular in the interior of the vehicle.

The adhesive used for the adhesive layer 18 can preferably be a curing adhesive, which cures, for example, due to the action of ultraviolet light, for example, due to sunlight. After the curing, the adhesive may only be detached from the substrate with great difficulty. Parts of the coating 16 also adhere to the adhesive of the adhesive layer 18. It can therefore be visually established in a simple manner whether a manipulation has been performed by detaching the already glued vehicle identification means 10. For this purpose, in particular individual regions of the coating are bonded more strongly to the adhesive layer 18 and other regions are bonded more strongly to the film 12. Therefore, the coating 18 is torn apart into parts adhering to the film 12, on the one hand, and into parts adhering to the adhesive, on the other hand. Thus, a visually visible destruction of the coating 18 is performed. Since the coating 18 preferably relates to the hologram 36, the hologram is visibly destroyed at the same time.

Alternatively or additionally, the film 12 can also be able to be folded together or can be able to be folded, which is not shown here. One layer of the film 12 then lies on top and one layer of the film 12 lies on the bottom. The coating 16 and also the radio chip 26 are then enclosed between the film layers in the interior. Furthermore, a possible inscription 22 is then also located between these layers of the film 12.

In particular, a reflective film for the reflection of light can also be implemented as an antenna. The reflective film typically has an electrically conductive layer or is formed thereby. It is therefore suitable as an antenna material. The reflective film is typically arranged underneath the hologram layer, in order not to reflect light shaded by an imprint in particular.

The vehicle identification means described here is preferably a vehicle identification, preferably a motor vehicle identification. It relates in particular to a so-called "third identification", which is attached in addition to the "license plates" on a (motor) vehicle. The vehicle identification is preferably fastened on a windowpane of the vehicle, in particular on the windshield, preferably in the interior. In addition to the identification of the vehicle or the owner, respectively, further data, for example control data or toll charges, can also be ascertained or proven on the basis of this identification means.

LIST OF REFERENCE NUMERALS 10 vehicle identification means
12 film
14 hologram symbol
16 coating
18 adhesive layer
20 inscription field
22 inscription
24 slot
26 data carrier
28 contact material
30 opening
32 antenna coil
34 data carrier
36 hologram
40 opening
42 conductor loop

What is claimed is:

1. A vehicle identification means, comprising:
an at least partially electrically conductive film (12) which is at least partially implemented as a hologram (36) and/or as a reflective film, the film (12) having an electrically conductive coating (16) for creating the conductivity;
a plurality of data carriers (26) which can be read out in a contactless manner; and
at least one antenna for each of the plurality of data carriers (26),
wherein the hologram (36) and/or the reflective film is implemented as the at least one antenna for each of the plurality of data carriers (26); and wherein the coating (16) has regions in which electrical conductivity is reduced or interrupted, the regions being in the form of a slot (24), in order to implement at least one antenna structure for the at least one antenna, the at least one antenna structure being selected from the group consisting of a slot antenna, a conductor loop, and a plate antenna.

2. The vehicle identification means as claimed in claim 1, wherein the data carrier (26) can be read out in multiple frequency ranges independently of one another, wherein a separate one of the at least one antenna is implemented for separate readout of each of the multiple frequency ranges.

3. The vehicle identification means as claimed in claim 2, wherein one of the at least one antenna is implemented in an opening (30) of another one of the at least one antenna.

4. The vehicle identification means as claimed in claim 1, wherein:
in addition to the electrically conductive coating (16), the remainder of the film (12) has regions in which electrical conductivity is reduced or interrupted, the regions being in the form of a slot (24), in order to implement at least one antenna structure for the at least one antenna, the at least one antenna structure being selected from the group consisting of a slot antenna, a conductor loop, and a plate antenna.

5. The vehicle identification means as claimed in claim 4, wherein the film (12) has an adhesive layer (18) on at least one side for fastening the vehicle identification means on a vehicle, wherein the adhesive layer (18) is applied on a side of the electrically conductive coating (16).

6. The vehicle identification means as claimed in claim 5, wherein the plurality of data carriers (26) are placed on the film, or are inserted into an opening of the film (12), wherein the plurality of data carriers (26) are arranged on the side of the film (12) having the adhesive layer (18).

7. The vehicle identification means as claimed in claim 5, wherein at least one of the film (12), the coating of the film (12), and the hologram (36) has features of destruction, which are visually recognizable to an observer without aids, in the event of detachment or manipulation of the at least one adhesive layer (18).

8. The vehicle identification means as claimed in claim 5, wherein the transmitting and/or receiving power of the at least one antenna is reduced after a detachment of the adhesive layer (18) or a manipulation of the hologram (36) by way of an easily destructible safeguard.

9. The vehicle identification means as claimed in claim 8, wherein the easily destructible safeguard is a conductor loop (42).

10. The vehicle identification means as claimed in claim 4, wherein the film has an electrically conductive coating that is a metallic coating (16).

11. The vehicle identification means as claimed in claim 10, wherein the metallic coating (16) is a vapor deposition coating.

12. The vehicle identification means as claimed in claim 1, wherein the plurality of data carriers (26) are electrically connected to the at least one antenna or to an electrically conductive coating (16) on the film (12), in a galvanic and/or capacitive and/or inductive manner.

13. The vehicle identification means as claimed in claim 1, wherein one of the at least one antenna is implemented as a near-field antenna and another one of the at least one antenna is implemented as a far-field antenna, wherein separate structures are provided for each of the at least one antenna.

14. The vehicle identification means as claimed in claim 1, wherein the film (12) has at least one adhesive layer (18) for gluing at least two layers of the film (12) to one another, wherein the film (12) is at least one of (i) folded together at a predetermined bending point, and (ii) implemented as a self-adhesive film (12).

15. The vehicle identification means as claimed in claim 1, wherein the film (12) is inscribed on at least one side, between two layers of the film (12) that are fastened on one another to protect from manipulations.

16. The vehicle identification means as claimed in claim 1, wherein at least one of the plurality of data carriers (26) is a radio chip.

17. The vehicle identification means as claimed in claim 1, wherein the film (12) has an adhesive layer (18) on at least one side for fastening the vehicle identification means on a vehicle, wherein the adhesive layer (18) is applied on a side of the reflective film.

18. A vehicle identification means comprising:
an at least partially electrically conductive film (12) having an electrically conductive coating (16) for creating the conductivity;
a plurality of data carriers (26) which can be read out in a contactless manner, wherein each of the plurality of data carriers (26) can be read out in multiple frequency ranges independently of one another; and
at least one antenna for each of the plurality of data carriers (26),
wherein the film (12) is at least partially implemented as the at least one antenna for each of the plurality of data carriers (26) and for the separate readout of each of the plurality of data carriers (26),
wherein a separate one of the at least one antenna is provided for each of the multiple frequency ranges, is assigned to each of the plurality of data carriers (26), and is implemented as optimized to an associated one of the multiple frequency ranges, and
wherein the coating (16) has regions in which electrical conductivity is reduced or interrupted, the regions being in the form of a slot (24), in order to implement at least one antenna structure for the at least one antenna, the at least one antenna structure being selected from the group consisting of a slot antenna, a conductor loop, and a plate antenna.

19. The vehicle identification means as claimed in claim 18, wherein at least one of:
the film (12) is at least partially implemented as a reflective hologram (36), wherein the reflective hologram (36) is implemented as the at least one antenna for each of the plurality of data carriers (26);
the film (12) is at least partially implemented as a reflective film; and
the film (12) is implemented as an embossed hologram.

20. The vehicle identification means as claimed in claim 18, wherein:
in addition to electrically conductive coating (16), the remainder of the film (12) has regions in which electrical conductivity is reduced or interrupted, the regions being in the form of a slot (24), in order to implement at least one antenna structure for the at least one antenna, the at least one antenna structure being selected from the group consisting of a slot antenna, a conductor loop, and a plate antenna.

21. The vehicle identification means as claimed in claim 20, wherein one of the at least one antenna is implemented in an opening (30) of another one of the at least one antenna.

22. The vehicle identification means as claimed in claim 20, wherein the film (12) has an adhesive layer (18) on at least one side for fastening the vehicle identification means on a vehicle, wherein the adhesive layer (18) is applied on a side of the electrically conductive coating (16).

23. The vehicle identification means as claimed in claim 22, wherein the plurality of data carriers (26) are placed on the film, or are inserted into an opening of the film (12), wherein the plurality of data carriers (26) are arranged on the side of the film (12) having the adhesive layer (18).

24. The vehicle identification means as claimed in claim 22, wherein at least one of the film (12), the coating of the film (12), and the hologram (36) has features of destruction, which are visually recognizable to an observer without aids, in the event of detachment or manipulation of the at least one adhesive layer (18).

25. The vehicle identification means as claimed in claim 22, wherein the transmitting and/or receiving power of the at least one antenna is reduced after a detachment of the adhesive layer (18) or a manipulation of the hologram (36) by way of an easily destructible safeguard.

26. The vehicle identification means as claimed in claim 25, wherein the easily destructible safeguard is a conductor loop (42).

27. The vehicle identification means as claimed in claim 20, wherein the film has an electrically conductive coating that is a metallic coating (16).

28. The vehicle identification means as claimed in claim 27, wherein the metallic coating (16) is a vapor deposition coating.

29. The vehicle identification means as claimed in claim 18, wherein the plurality of data carriers (26) are electrically connected to the at least one antenna or to an electrically conductive coating (16) on the film, in a galvanic and/or capacitive and/or inductive manner.

30. The vehicle identification means as claimed in claim 18, wherein one of the at least one antenna is implemented as a near-field antenna and another one of the at least one antenna is implemented as a far-field antenna, wherein separate structures are provided for each of the at least one antenna.

31. The vehicle identification means as claimed in claim 18, wherein the film (12) has at least one adhesive layer (18) for gluing at least two layers of the film (12) to one another, wherein the film (12) is at least one of (i) folded together at a predetermined bending point, and (ii) implemented as a self-adhesive film (12).

32. The vehicle identification means as claimed in claim 18, wherein the film (12) is inscribed on at least one side, between two layers of the film (12) that are fastened on one another to protect from manipulations.

33. The vehicle identification means as claimed in claim 18, wherein at least one of the plurality of data carriers (26) is a radio chip.

34. The vehicle identification means as claimed in claim 18, wherein the film (12) has an adhesive layer (18) on at least one side for fastening the vehicle identification means on a vehicle, wherein the adhesive layer (18) is applied on a side of the reflective film.

35. The vehicle identification means as claimed in claim 1, wherein the film (12) has an adhesive layer (18) on at least one side for fastening the vehicle identification means on a vehicle, wherein the adhesive layer (18) is applied on a side of the electrically conductive coating (16).

* * * * *